Figure 1:
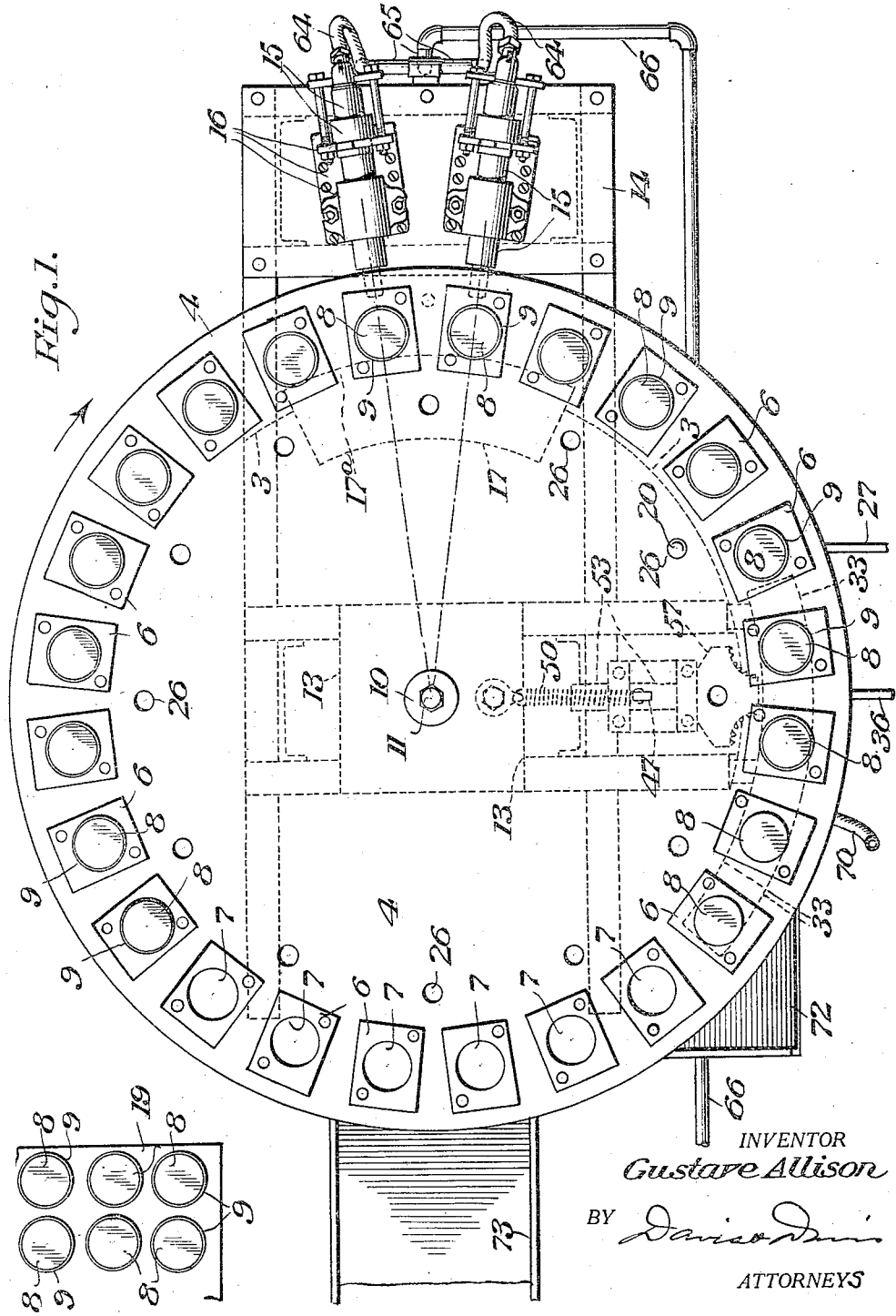

Aug. 26, 1924.

G. ALLISON 1,506,354

SHRAPNEL SALVAGING APPARATUS AND METHOD

Filed May 2, 1923    5 Sheets-Sheet 1

INVENTOR
Gustave Allison
BY
ATTORNEYS

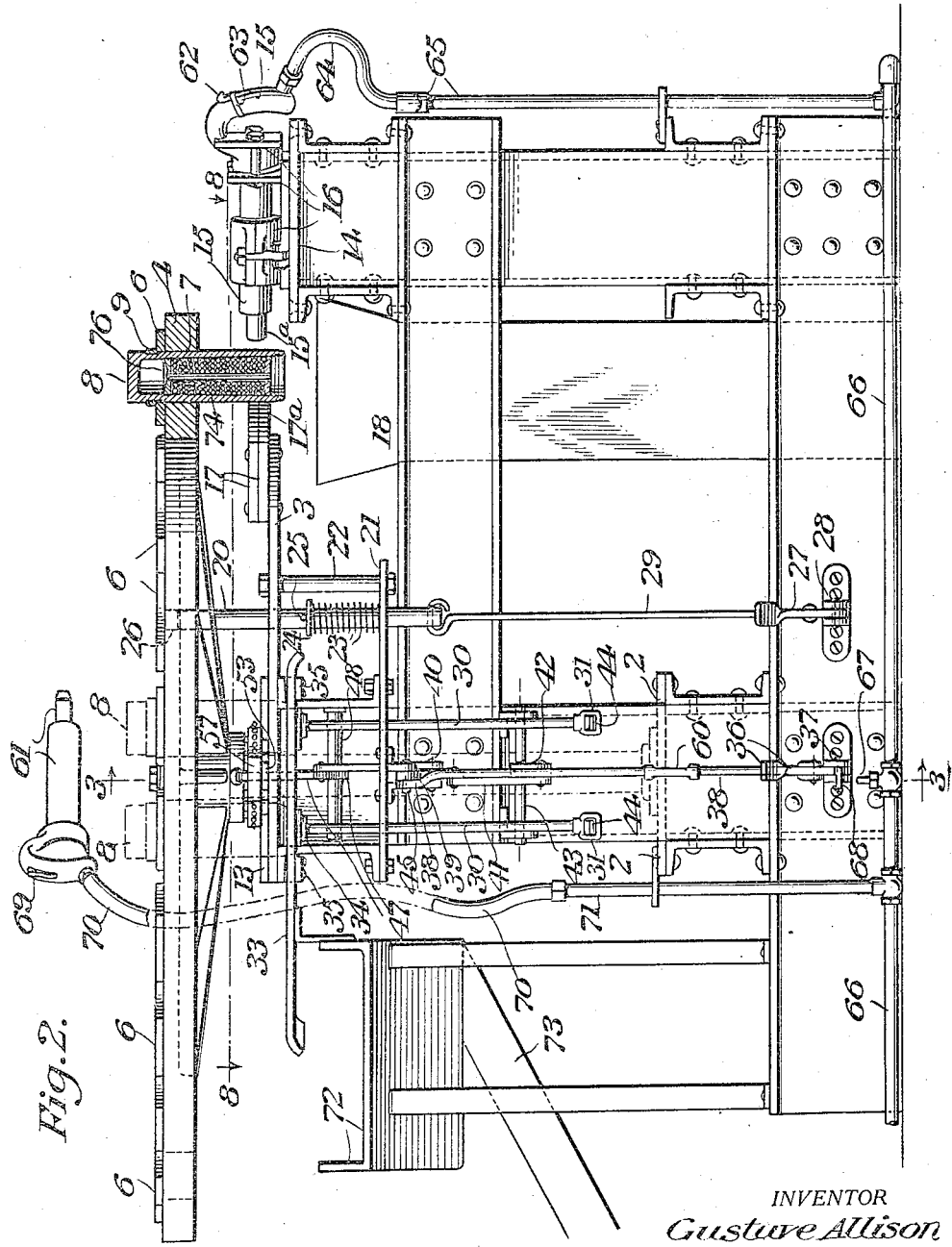

Aug. 26, 1924. 1,506,354
G. ALLISON
SHRAPNEL SALVAGING APPARATUS AND METHOD
Filed May 2, 1923 5 Sheets-Sheet 3
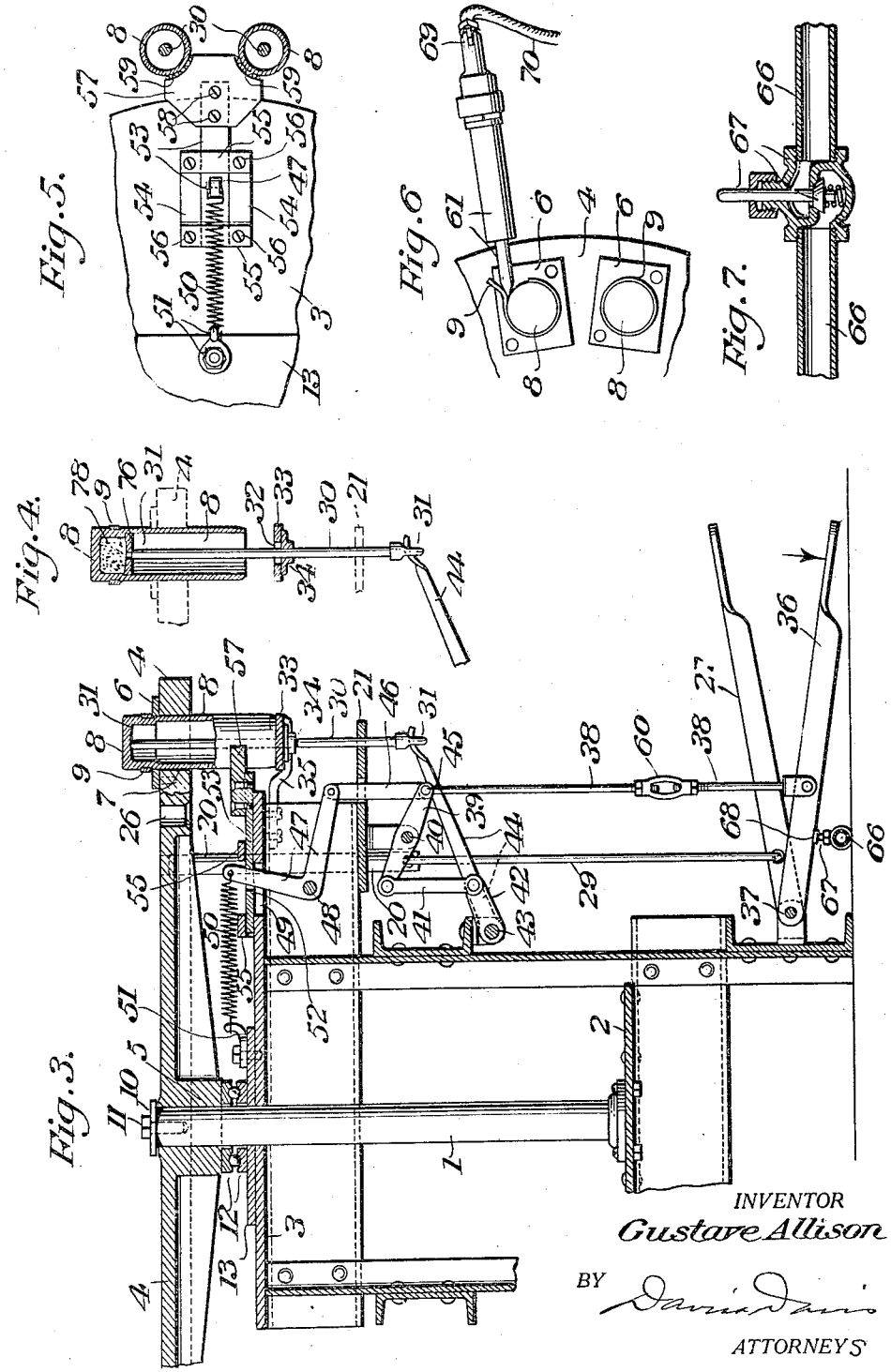
INVENTOR
Gustave Allison
BY
ATTORNEYS

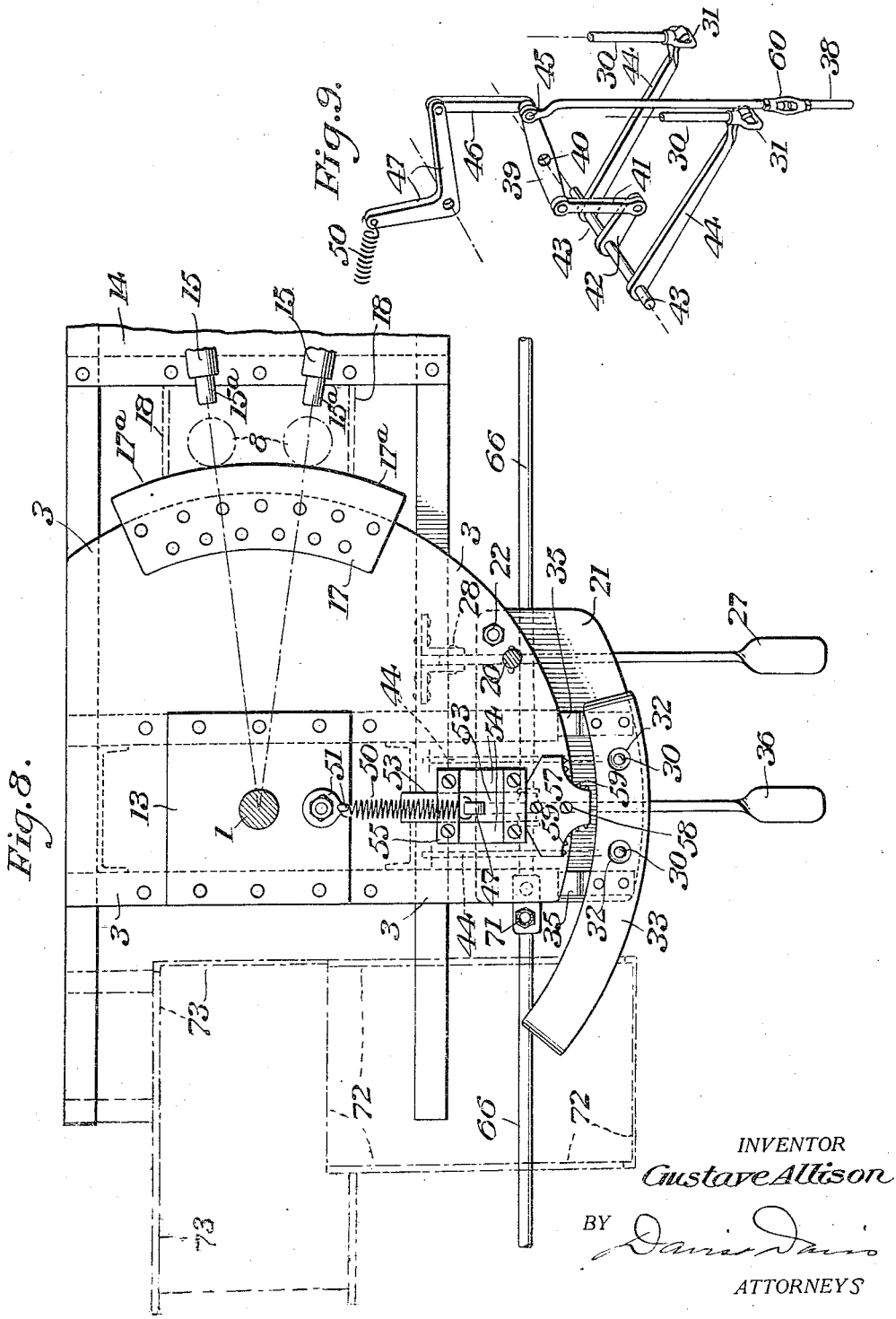

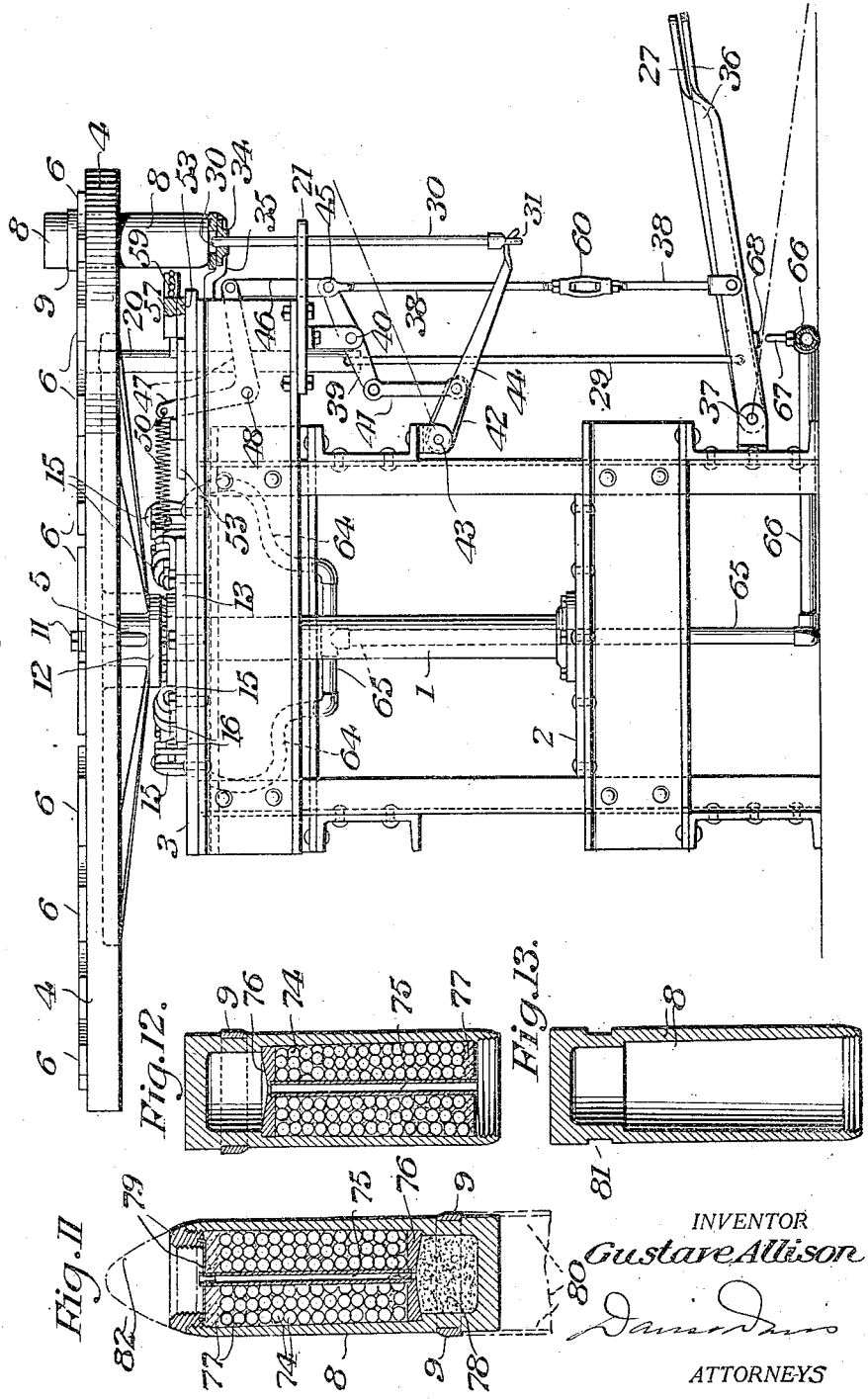

Patented Aug. 26, 1924.

1,506,354

UNITED STATES PATENT OFFICE.

GUSTAVE ALLISON, OF PERTH AMBOY, NEW JERSEY, ASSIGNOR TO COLUMBIA SALVAGE CORPORATION, OF NEW YORK, N. Y., A CORPORATION OF NEW YORK.

SHRAPNEL-SALVAGING APPARATUS AND METHOD.

Application filed May 2, 1923. Serial No. 636,105.

*To all whom it may concern:*

Be it known that I, GUSTAVE ALLISON, a citizen of the United States, and resident of Perth Amboy, in the county of Middlesex and State of New Jersey, have invented certain new and useful Improvements in Shrapnel-Salvaging Apparatus and Methods (Case No. 11), of which the following is a specification.

This invention relates to improvements in salvaging artillery ammunition of the shrapnel type, and has for one of its objects the provision of an apparatus for unloading shrapnel shell bodies and removing the shell-rotating bands therefrom in a rapid and economical manner. A further object of the invention is to provide means for unloading shrapnel shells, removing the rotating bands from the shell bodies, and separately discharging the shell bodies and their contents. The invention further consists in an improved method of disassembling rounds of shrapnel ammunition for salvaging the constituent parts thereof.

In the drawings—

Figure 1 is a plan view of a shell salvaging apparatus embodying the invention;

Fig. 2 a side elevation thereof;

Fig. 3 a fragmentary vertical sectional view on the line 3—3 of Fig. 2, the treadle controlling the shell-jarring means, the shell-testing means, and the shell-gripping means being shown depressed;

Fig. 4 a detail view showing a partially unloaded shell elevated by the testing means;

Fig. 5 a detail view showing parts of the shell gripping and testing means in active position;

Fig. 6 a detail plan view showing the rotating-band removing means;

Fig. 7 a detail sectional view of the pressure supply valve for the shell-jarring means.

Fig. 8 a horizontal section on the line 8—8 of Fig. 2;

Fig. 9 a detail perspective view showing parts of the actuating means for the shell gripper and the shell testing plungers;

Fig. 10 an end elevation of the apparatus, looking toward the shell jarring hammers;

Fig. 11 a fragmentary longitudinal section of a round of shrapnel ammunition;

Fig. 12 a longitudinal section of a shrapnel shell, with the bursting explosive charge, the fuse, and the shell head removed; and Fig. 13 a longitudinal section of a salvaged shell body, the body being entirely unloaded and the rotating band removed.

Referring to the drawings by numerals, the shell salvaging apparatus comprises a suitable rigid frame, preferably constructed of metal U-beams as shown. A stationary vertical post 1 is rigidly held at its lower end to a platform 2 in the frame and extends upwardly through a platform 3 and plate 13 in the frame to a point above the frame. A rotary shell carrier is mounted on the upper end of post 1 and is adapted to be revolved by hand step-by-step around said post. The carrier comprises a flat table or turret 4 of circular form having a central hub 5 and an annular series of twenty-four wear plates 6 rigidly secured to its upper face adjacent the outer edge of the table, the carrier being formed with an annular series of twenty-four circular shell-receiving apertures 7 each of which extends through the table 4 and one of said plates 6.

The diameter of apertures 7 corresponds with the diameter of the body portions 8 of the shrapnel shells to be salvaged and is less than the diameter of the shell-rotating bands 9, so that shells may be suspended in the carrier by the shell-rotating bands as shown. The apertures 7 are spaced equal distances apart around table 4. The table 4 is held on post 1 by a washer 10 and a screw 11 which passes down through said washer and is screwed into the upper end of post 1. A suitable antifriction bearing 12 is interposed between hub 5 and the plate 13 secured to platform 3.

One end of the frame extends laterally beyond the edge of the shell carrier 4 and a platform 14 is rigidly held to this projecting end of the frame below the plane of the carrier. Upon the platform 14 two shell unloading or shell-jarring devices are rigidly mounted. As shown, these devices comprise fluid pressure hammers 15 immovably held in horizontal positions on the platform 14 by suitable clamping devices 16. The hammers 15 are arranged radially of the carrier with their vibratory hammer heads 15ª under the table and just outside of the path of the depending portions of the shell bodies 8 so that said heads are adapted to rap against the shell bodies intermediate the carrier 4 and the lower ends of the shell bodies. An anvil 17 is rigidly held to platform 3 opposite the hammers 15 and in line with the hammer heads 15ª, said anvil having an arcuate edge 17ª overhanging platform 3 along which the side edges of the depending parts of the shell bodies ride as they pass between the anvil and the hammers. As shown, the anvil comprises two superimposed segmental metal plates riveted to the platform 3. The anvil braces the depending ends of the shells and relieves table 4 of most of the shock of the hammer blows. A suitable vertical discharge chute 18 is mounted in the frame with its mouth underlying the lower ends of the two shell bodies which are in register with the hammers.

At one side of the frame, between the shell unloading station and the shell delivering station, hereinafter described, is arranged a suitable shell supply platform or station 19 at which is stationed one operative whose duty it is to take the shells from said platform and insert the shells in the openings 7 of the carrier with their open ends down, as more fully hereinafter set forth. At the opposite side of the frame, between the shell jarring or unloading station and the shell body delivering station, is arranged the shell evacuation testing means, the rotating band removing means, the shell-carrier locking and unlocking means, and the shell-jarring hammer controlling means, all arranged for convenient operation by a single operative whose duty it is to also intermittently turn the table by hand.

The table locking means comprises a vertically reciprocable latch bolt or plunger 20 which extends through platform 3 and a lower platform 21 which is rigidly bolted to the frame and also is held to platform 3 by a bolt 22. The plunger is normally pressed up to locking position by a coil spring 23 which surrounds the plunger, the lower end of said spring engaging platform 21 and its upper end engaging a washer 24 held against upward movement on the plunger by a pin 25. The latch plunger is adapted to automatically snap successively in each one of an annular series of twelve equally spaced latch-bolt holes or apertures 26 bored through table 4 inside of the annular series of shell-receiving apertures, the sides of said apertures preferably flaring downwardly and outwardly at the lower ends of the apertures as shown in Fig. 3 to facilitate the entrance of the plunger into the apertures. A latch-releasing treadle 27 is pivotally held at 28 to the frame and extends outwardly beyond the edge of table 4. The treadle 27 is connected by a vertical link 29 with the lower end of the latch plunger and is normally drawn or rocked upwardly as shown in Figs. 2, 3, and 10 by the spring 23. When the plunger is engaged in one of the apertures 26, two shells are locked in register with the hammers 15 in contact with anvil 17, and two shells which have been acted on by the hammers are locked in register with the two shell-testing plungers hereinafter described and also in position to be held by the shell-gripping means during removal of the rotating bands, as hereinafter described.

The shell-testers comprise two vertically reciprocable plungers 30 having their upper ends normally drawn downward within sockets 32 in a segmental or arcuate shell-supporting track 33 located beneath table 4 preferably at a distance equal to the distance the shell bodies 8 depend below the table. The ends of track 33 are preferably turned slightly downward as shown and the lower open ends of the unloaded shell bodies 8 rest on the track while in position for action thereon by the testing and band removing means and are supported by the track after removal of the bands until carried to the shell-body delivering station by one or more subsequent feed movements of the table 4. Track 33 is supported on the main frame by suitable brackets 35. Sockets 32 are preferably formed by boring apertures through the track and securing plates 34 to the under side of the track, the stems of the test plungers being guided in apertures in plates 34 and platform 21.

Plungers 30 are adapted to be elevated by depression of a treadle 36 pivotally held at its inner end to the frame at 37 and extending outwardly beyond table 4 alongside the treadle 27. A vertical link 38 connects treadle 36 with the forward end of a lever 39 pivoted at 40 to a suitable bracket depending from platform 21. The rear end of lever 39 is connected by a depending link 41 with the forward end of a central rock arm 42 fixed on a rock shaft 43 journaled in suitable brackets on the frame. A pair of rock arm 44 extend outwardly from shaft 43 adjacent the ends of said shaft and have their outer ends inserted in stirrups or loops 31 on the lower ends of the testing plungers 30. It will be seen, therefore, that whenever treadle 36 is depressed the plungers will be elevated as shown in Figs. 3 and 4 and will move upwardly within the two shell bodies which are locked in register therewith.

The pivot pin 45 which connects the upper end of link 38 with lever 39 also connects the lower end of a vertical link 46 with said lever, the upper end of link 46 being pivotally held to the outwardly extending arm of a bell-crank lever 47 pivoted on a rod 48 held to the frame. The other arm of lever 47 extends upwardly through platform 3 and is adapted to swing inwardly and outwardly in a slot 49 in said platform which extends radially of table 4, this arm of the lever 47 being normally rocked toward the inner end of slot 49 by a spring 50 which connects the upper end of the lever arm with a hook 51 secured to plate 13 on platform 3. The upwardly extending arm of bell-crank lever 47 passes through a hole 52 in a horizontally slidable bar 53 held to platform 3 to move radially of table 4. This bar may be guided in any suitable manner, the means shown comprising two parallel bars 54 resting on platform 3 along the longitudinal side edges of slide bar 53 and two transverse bars 55 extending over bar 53 and resting on the ends of bars 54, bars 54 and 55 being fastened to platform 3 by screws 56. A duplex shell-gripping head 57 is rigidly held by screws 58 to the outer end of slide bar 53, said head comprising a flat metal block having its two outer corners cut away on an arc of a circle and said arcuate edges of the block being provided with pointed studs or teeth 59 adapted to bite into the two shell bodies in front of the gripper head when treadle 36 is depressed, as shown in Figs. 3 and 5.

Spring 50 normally holds the gripping device retracted beyond the inner edge of track 33 and the path of movement of the shell bodies, and also normally holds treadle 36 elevated so that plungers 30 are normally drawn downward. Link 38 is preferably made in two sections connected by a turnbuckle 60 so that the length of said link may be adjusted to regulate the movement of the parts operated by treadle 36. The upward throw of the testing plungers 30 is limited by the engagement of gripper head 57 with shell bodies 8, the parts being preferably so proportioned that the plungers may move up within a completely evacuated or unloaded shell body into contact with the closed end of the body without elevating the shell body, as shown in Fig. 3. If a shell body is not completely emptied it will be lifted more or less, carrying the rotating band upward away from plate 6 on the carrier, thereby indicating to the operative at the testing and band removing station that the band should not be removed and that the shell should be left suspended in the carrier by its rotating band so it will again pass around to the unloading or jarring means. If the test shows the shell bodies to be empty the operative at the testing station maintains pressure on treadle 36 to hold gripper 57 firmly against the shell bodies and cuts off the copper rotating bands 9 with a portable fluid-pressure-operated chisel 61 of ordinary construction.

When the bands 9 have been removed the band-removing operative releases treadle 36, depresses treadle 27, and turns the table 4, releasing treadle 27 as the table turns to permit latch 20 to snap into the next hole 26 in the table. This operation brings two more loaded shells opposite hammers 15 and two more unloaded shells in position for the testing and band cutting operations. The hammers 15 have their usual manually operated pressure supply triggers 62 constantly locked in depressed or pressure supplying position by a suitable clamping band 63, as shown in Fig. 2, and the supply inlets of said hammers are connected by hose 64 with an upstanding T-terminal 65 of a fluid pressure supply pipe line 66. The flow of pressure to hammers 15 is normally cut off by a spring-pressed vertically reciprocating self-closing valve 67 interposed in the pipe 66. The stem of valve 67 is adapted to be engaged and depressed by a lug 68 on treadle 36 to open said valve and hold it open to cause hammers 15 to rap or jar two loaded shells during the time two unloaded shells are having the rotating bands 9 removed therefrom. The trigger 69 of chisel 61 is manipulated by hand by the band cutting operative in the usual way to control the supply of pressure to the chisel, said chisel having its supply inlet connected by a hose 70 with a vertical branch pipe 71 connected with supply pipe 66 between valve 67 and the source of fluid pressure.

Track 33 extends beyond the band removing station to a point above a suitable chute section 72 which extends downwardly and inwardly transversely of the main frame into the upper end of a second chute section 73 which extends downwardly and outwardly longitudinally of the frame to a point beyond the table 4. The chute sections 72—73 are held to the frame by suitable braces and brackets. As the shell bodies which have been unloaded and had the rotating bands removed therefrom are carried beyond the end of track 33 overlying the chute section 72 they drop from the table 4 upon said chute section and pass down to chute section 73 and thence along section 73 to a suitable delivery point. The steel shell bodies delivered from the chute are conveyed to a suitable reduction furnace and melted down to salvage the metal. The chute 18 preferably delivers the shrapnel balls 74, the brass powder tube 75, the steel diaphragm 76, and the resin and napthalene mixture 77 in which the balls are embedded, together with any of the bursting explosive charge 78 which may be in the shells when they are placed on the carrier or table, at a suitable point, preferably to a separating or screening mechanism, not shown, for segregating the various metal parts 74, 75 and 76 in order that they may be melted down to salvage the metal. I prefer to remove all of the powder charge 78 from the shell, as shown in Fig. 12, before the shell is mounted on the carrier, by sifting or flushing the powder out through the powder tube 75. The testing of the shells by plungers 30 prevents the delivery of partially unloaded shells at the shell body discharge, thus eliminating excess foreign matter from the melted metal when the shell bodies are melted down and also preventing explosions in the reduction furnace due to accidental placing of shells with confined powder charges in the furnace. The salvaging operation may be briefly recapitulated as follows:

The rounds of assembled shrapnel comprise a brass cartridge case 80 containing the propelling charge, a steel shell body 8 to the closed base of which the cartridge case is detachably held, a copper rotating band 9, partly countersunk in a groove 81 in the shell body near the base of the body, a bursting charge 78, a removable steel diaphragm 76, a removable steel shell head or outer diaphragm 79 provided with a threaded socket for the fuse device 82, a brass powder tube 75 extending through diaphragm 76 and head 79 to connect the powder train of the fuse device with the bursting charge, and a multiplicity of bullets or shrapnel balls 74 embedded in a mixture 77 such as resin and napthalene between the diaphragm 76 and head 79. I remove the cartridge case 80 and the fuse device 82 leaving the shell proper as shown in full lines in Fig. 11. The cartridge case is emptied and melted down, and the propelling charge may be treated in any suitable way if desired to recover various chemicals. The metal parts of the fuses may be melted down also, if desired. The shell head 79 is detached and the powder charge 78 is preferably removed through tube 75. The shells in the condition shown in Fig. 12 are then carried to loading table 19 and are inserted, open end down, in the shell receiving apertures 7 of the table 4 from which they are suspended by contact of bands 9 with plate 6. The shells are then advanced to the jarring hammers 15 where the parts 76, 75, 74 and 77 are loosened by vibration and drop down into chute 18. Any powder 78 not previously removed from the shells will be discharged into chute 18 also. The shells are then carried to the supporting track 33 and the testing plungers and band removing means. Shells shown to be empty then have the copper bands 9 cut therefrom. The shells are next advanced beyond the end of track 33 to the discharge chute into which the empty shells fall. The table is then advanced to again carry the shell-receiving openings from which the shells have dropped to the loading platform and to advance incompletely evacuated shells to the jarring hammers a second time. The emptied shells delivered from the table are carried to a reduction furnace and melted down. The material jarred out of the shells by the hammers is separated in any suitable manner, as by screening, and the metal parts melted down.

What I claim is:

1. In an apparatus of the class set forth, the combination of a traveling shell carrier, shell emptying means, means for testing shells operated upon by said emptying means to determine the extent of evacuation of the contents of the shell, and means for discharging emptied shells from the carrier.

2. In an apparatus of the class set forth, the combination of jarring means, shell-rotating band cutting means, means for conveying shell bodies past said jarring means and band cutting means, and means for holding said conveying means against movement when shell bodies are presented at said jarring means and band cutting means.

3. In an apparatus of the class set forth, the combination of jarring means, shell-rotating band cutting means, means for conveying shell bodies past said jarring means and band cutting means, means for holding said conveying means against movement when shell bodies are presented at said jarring means and band cutting means, and means for releasing shell bodies from the conveying means after removal of the rotating bands.

4. In an apparatus of the class set forth, the combination of means for suspending a headless shrapnel shell open end down by the shell rotating band, means for jarring the suspended shell, and means for cutting the rotating band from the shell.

5. In an apparatus of the class set forth, the combination of means for suspending a headless shrapnel shell open end down by its rotating band, means for jarring the suspended shell to discharge its contents, testing means for indicating the extent of evacuation of the shell, and means for cutting the rotating band from an emptied shell.

6. In an apparatus of the class set forth, the combination of a shell jarring means, rotating band removing means, and traveling means for supporting headless shrapnel shells open end down by the shell rotating bands, said traveling means being movable to present shells successively to the jarring means and band removing means.

7. In an apparatus of the class set forth, the combination of an anvil, shell jarring means opposite said anvil, an endless carrier for headless shrapnel shells movable to present shells between the anvil and said jarring means, and means for locking the carrier during jarring operations.

8. In an apparatus of the class set forth, the combination of shell jarring means, rotating band removing means, a rotary shell carrier adapted to support headless shrapnel shells open end down by their rotating bands, and movable to present shells successively to the jarring and band removing means, and a stationary track extending past the band removing means under said carrier cooperating with the depending ends of the shells for supporting the shells during removal of the bands.

9. In an apparatus of the class set forth, the combination of shell jarring means, rotating band removing means, a rotary shell carrier adapted to support headless shrapnel shells open end down by their rotating bands, and movable to present shells successively to the jarring and band removing means, a stationary track extending past the band removing means under said carrier cooperating with the depending ends of the shells for supporting the shells during removal of the bands, and a shell delivery chute at one end of the track adapted to receive empty shell bodies carried from the band removing means.

10. In an apparatus of the class set forth the combination of a rotatable shell carrier, means for supporting the carrier to rotate about a vertical axis, said carrier being provided with an annular series of shell receiving apertures adapted to permit the passage of headless shell bodies therethrough open end down and hold the shells suspended by engagement of the shell rotating bands with the upper face of the carrier, power-operated shell-jarring means and hand-controlled power-operated band-removing means located at points spaced apart around the carrier, and foot-operated means adjacent the band-removing means for controlling the operation of the shell-jarring means.

11. In an apparatus of the class set forth the combination of a rotatable shell carrier, means for supporting the carrier to rotate about a vertical axis, said carrier being provided with an annular series of shell receiving apertures adapted to permit the passage of headless shell bodies therethrough open end down and hold the shells suspended by engagement of the shell rotating bands with the upper face of the carrier, power-operated shell-jarring means and hand-controlled power-operated band-removing means located at points spaced apart around the carrier, foot-operated means adjacent the band-removing means for controlling the operation of the shell-jarring means, and a foot-controlled carrier locking means located adjacent the band removing means for locking the carrier against movement with different shell bodies in cooperative relation with the jarring means and band removing means.

12. In an apparatus of the class set forth the combination of a rotatable shell carrier, means for supporting the carrier to rotate about a vertical axis, said carrier being provided with an annular series of shell receiving apertures adapted to permit the passage of headless shell bodies therethrough open end down and hold the shells suspended by engagement of the shell rotating bands with the upper face of the carrier, power-operated shell-jarring means and hand-controlled power-operated band-removing means located at points spaced apart around the carrier, foot-operated means adjacent the band-removing means for controlling the operation of the shell-jarring means, and a vertically shiftable testing plunger movable a fixed distance by said foot-operated means and adapted to elevate incompletely evacuated shells presented at the band removing means.

13. In in apparatus of the class set forth the combination of a rotatable shell carrier, means for supporting the carrier to rotate about a vertical axis, said carrier being provided with an annular series of shell receiving apertures adapted to permit the passage of headless shell bodies therethrough open end down and hold the shells suspended by engagement of the shell rotating bands with the upper face of the carrier, power-operated shell-jarring means and hand-controlled power-operated band-removing means located at points spaced apart around the carrier, foot-operated means adjacent the band-removing means for controlling the operation of the shell-jarring means, a vertically shiftable testing plunger movable a fixed distance by said foot-operated means and adapted to elevate incompletely evacuated shells presented at the band removing means, and means actuated by said foot-operated means adapted to hold shells presented to the band removing means against rotation, said holding means limiting the upward movement of the testing plunger by its engagement with a shell.

14. In an apparatus of the class set forth, the combination of a rotatable shell carrier, means for supporting the carrier to rotate about a vertical axis, said carrier being provided with an annular series of shell receiving apertures adapted to permit the passage of headless shell bodies therethrough open end down and hold the shells suspended by engagement of the shell rotating bands with the upper face of the carrier, power-operated shell-jarring means and hand-controlled power-operated band-removing means located at points spaced apart around the carrier, foot-operated means adjacent the band-removing means for controlling the operation of the shell-jarring means, a foot-controlled carrier locking means located adjacent the band removing means for locking the carrier against movement with different shell bodies in cooperative relation with the jarring means and band removing means, a shell body delivery chute, and an arcuate track under the carrier extending past the band removing means to said chute over which the lower ends of the shell bodies are adapted to slide.

15. In an apparatus of the class set forth, the combination of a pair of power-operated shell-jarring devices, a hand-controlled power-operated band removing device, foot-operated means adjacent said band-removing device for controlling the operation of the jarring devices, a rotary shell carrier, means for automatically locking the carrier as successive pairs of shells are presented to the jarring and band-removing devices by intermittent rotary movements of the carrier, and foot-operated means adjacent said first-mentioned foot-operated means for releasing the carrier.

16. In an apparatus of the class set forth, the combination of a pair of power operated shell jarring devices, a pair of shell evacuation testing devices, a shell carrier for conveying headless shrapnel shells open end down in pairs first to said jarring devices and then to said testing devices, and means for operating the testing devices and simultaneously putting the jarring devices into action.

17. In an apparatus of the class set forth the combination of a power-operated shell-jarring device, a vertically reciprocable shell evacuation testing plunger, a traveling shell carrier provided with means for supporting a plurality of headless shrapnel shells open end down, said carrier being movable to present shells successively to the jarring device and the testing plunger, and manually operable means for shifting the testing plunger upwardly within a shell presented thereto and simultaneously putting the power operated jarring device into action.

18. The method of salvaging rounds of shrapnel ammunition which consists in removing the cartridge case and the fuse and shell head from the shell, suspending the shell head end down by its rotating band, jarring the suspended shell to evacuate the contents thereof, testing the suspended shell to ascertain the extent of evacuation, cutting off the rotating band from evacuated shell, supporting the evacuated shell at its lower end during removal of the band, and moving the bandless shell laterally beyond the support.

19. The method of salvaging rounds of shrapnel ammunition which consists in removing the cartridge case and the fuse and shell head from the shell body, suspending the shell body head end down by its rotating band, jarring the shell body to evacuate the same, moving the suspended shell laterally across a support to a delivery point, and cutting off the rotating band while the shell is over the support.

20. The method of salvaging rounds of shrapnel ammunition which consists in removing the cartridge case and the fuse and shell head from the shell body, suspending the shell body head end down by its rotating band, jarring the shell body to evacuate the same, moving the suspended shell laterally across a support to a delivery point, cutting off the rotating band while the shell is over the support, and melting down the evacuated and bandless shell bodies.

21. The method of salvaging rounds of shrapnel ammunition which consists in removing the cartridge case and the fuse and shell head from the shell body, suspending the shell body head end down by its rotating band, jarring the shell body to evacuate the same, moving the suspended shell laterally across a support to a delivery point, cutting off the rotating band while the shell is over the support, melting down the evacuated and bandless shell bodies, segregating the metal parts jarred from the shell body, and melting down said metal parts.

22. In an apparatus of the class set forth, the combination of a frame, an upright post supported in the frame, a turntable rotatably held to the post and provided with an annular series of equally spaced shell-body receiving apertures and an annular series of equally spaced latch-bolt receiving apertures, an upstanding latch bolt reciprocably supported on the frame under the turntable adapted to engage in the bolt receiving apertures, a spring normally urging the bolt upwardly, a treadle pivotally held to the frame and operatively connected with the latch bolt for retracting said latch bolt, and a power-operated hammer mounted on the frame below the level of the turntable and arranged radially of the table with its impact end adjacent the outer edge of the path of movement of shell bodies depending through the shell-body receiving apertures, said latch bolt being arranged to lock the table with a shell body in line with said hammer upon engagement of the latch bolt in each successive latch-bolt aperture, and said table being adapted to support shell-bodies inserted head end down in the shell body receiving apertures by engagement of the rotating bands on the shell bodies with the upper face of the table.

23. In an apparatus of the class set forth, the combination of a frame, an upright post supported in the frame, a turntable rotatably held to the post and provided with an annular series of equally spaced shell-body receiving apertures and an annular series of equally spaced latch-bolt receiving apertures, an upstanding latch bolt reciprocably supported on the frame under the turntable adapted to engage in the bolt receiving apertures, a spring normally urging the bolt upwardly, a treadle pivotally held to the frame and operatively connected with the latch bolt for retracting said latch bolt, a power-operated hammer mounted on the frame below the level of the turntable and arranged radially of the table with its impact end adjacent the outer edge of the path of movement of shell bodies depending through the shell-body receiving apertures, said latch bolt being arranged to lock the table with a shell body in line with said hammer upon engagement of the latch bolt in each successive latch-bolt aperture, said table being adapted to support shell-bodies inserted head end down in the shell-body receiving apertures by engagement of the rotating bands on the shell bodies with the upper face of the table, and an anvil mounted on the frame under the turntable between the post and hammer and having its outer edge curved on an arc concentric with the path of movement of shell bodies on the turntable and adapted to be engaged by the side walls of such shell bodies as they are carried between the anvil and hammer.

24. In an apparatus of the class set forth, the combination of a shell conveyor in the form of a turntable, means for supporting the shells whereby they will be carried by said turn-table with their bases uppermost and their shell rotating bands exposed above the upper surface of the turn-table, pneumatically-operated hand-controlled band-removing means, and means to hold a shell against rotation during the operation of removing a band therefrom.

25. In an apparatus of the class set forth, the combination of a rotatable shell conveyor adapted to carry the shells with their shell rotating bands exposed, pneumatically operated hand-controlled band-removing means, and foot-operated means to hold a shell against rotation during the operation of removing a band therefrom.

26. In an apparatus of the class set forth, the combination of a rotatable carrier adapted to carry the shells with their shell rotating bands exposed, power-operated hand-controlled band-removing means, means to hold a shell against rotation during the operation of removing a band therefrom and power-operated shell-jarring means located at a point spaced apart around the carrier from the said band removing means.

In testimony whereof I hereunto affix my signature.

GUSTAVE ALLISON.